US006220703B1

(12) United States Patent
Evans et al.

(10) Patent No.: US 6,220,703 B1
(45) Date of Patent: Apr. 24, 2001

(54) OPHTHALMIC LENSES UTILIZING POLYETHYLENE TEREPHTHALATE POLARIZING FILMS

(75) Inventors: Russell E. Evans, Chino Hills; Thomas Balch, Rancho Palos Verdes; Edward A. Beeloo, Torrance; Nancy L. S. Yamasaki, Long Beach, all of CA (US)

(73) Assignee: Younger Manufacturing Co., Inc., Torrance, CA (US)

( * ) Notice: Subject to any disclaimer, the term of this patent is extended or adjusted under 35 U.S.C. 154(b) by 0 days.

(21) Appl. No.: 09/475,424

(22) Filed: Dec. 29, 1999

(51) Int. Cl.⁷ .............................. G02C 7/10; G02C 7/02; G02C 7/12
(52) U.S. Cl. .......................... 351/163; 351/177; 351/49
(58) Field of Search ............................. 351/159, 160 R, 351/160 H, 163, 177, 41, 44, 49; 359/485, 493; 623/6.11, 6.17

(56) References Cited

U.S. PATENT DOCUMENTS

| | | | |
|---|---|---|---|
| 3,833,289 | 9/1974 | Schuler | 350/155 |
| 3,940,304 | 2/1976 | Schuler | 156/245 |
| 4,090,830 | 5/1978 | Laliberte | 425/117 |
| 4,268,127 | 5/1981 | Oshima et al. | 350/337 |
| 4,274,717 | 6/1981 | Davenport | 351/169 |
| 4,418,992 | 12/1983 | Davenport et al. | 351/169 |
| 4,427,741 | 1/1984 | Aizawa et al. | 428/332 |
| 4,617,207 | 10/1986 | Ueki et al. | 428/1 |
| 4,873,029 | 10/1989 | Blum | 264/1.3 |
| 5,049,427 | 9/1991 | Starzewski et al. | 428/40 |
| 5,051,309 | 9/1991 | Kawaki et al. | 428/332 |
| 5,059,356 | 10/1991 | Nakamura et al. | 252/585 |
| 5,071,906 | 12/1991 | Tanaka et al. | 524/557 |
| 5,286,419 | 2/1994 | Van Ligten et al. | 264/1.3 |
| 5,434,707 | 7/1995 | Dalzell et al. | 359/485 |
| 5,641,372 | 6/1997 | Okuno | 156/230 |
| 5,702,813 | 12/1997 | Murata et al. | 428/332 |
| 5,718,849 | 2/1998 | Maus et al. | 264/2.2 |
| 5,757,459 | 5/1998 | Bhalakia et al. | 351/168 |
| 5,800,744 | 9/1998 | Munakata | 264/1.7 |
| 5,808,721 | 9/1998 | Wood et al. | 351/159 |
| 5,827,614 | 10/1998 | Bhalakia et al. | 428/411.1 |
| 5,830,578 | 11/1998 | Ono et al. | 428/446 |
| 5,882,774 | 3/1999 | Jonza et al. | 428/212 |
| 5,926,310 | 7/1999 | Tamura et al. | 359/350 |
| 5,965,247 | 10/1999 | Jonza et al. | 428/212 |
| 5,991,072 | 11/1999 | Solyntjes et al. | 359/361 |

OTHER PUBLICATIONS

Rodriguez, Ferdinand, "Principles of Polymer Systems," Hemisphere Publishing Corporation, Third Edition, pp. 20–27 and 484–487 (1989).

Hollander, A. et al. "The Influence of Vacuum–Ultraviolet Radiation on Poly(ethlene terephthalate)," *Journal of Polymer Science Part A: Polymer Chemistry*, vol. 34, 1511–1516 (1996).

Plastics Engineering Handbook of the Society of the Plastics Industry, Inc., Third Edition, Reinhold Publishing Corporation, New York, pp. 492–493 (1960).

Liston, Edward M., "Plasma Treatment for Improved Bonding: A Review," 35th Sagamore Army Materials Research Conference, pp. 199–218 (1988).

Glocker, David. A. et al., "Plasma Sources for Polymer Surface Treatment," *Handbook of Thin Film Process Technology* (1996).

*Primary Examiner*—Georgia Epps
*Assistant Examiner*—Jordan M. Schwartz
(74) *Attorney, Agent, or Firm*—Lyon & Lyon LLP

(57) ABSTRACT

An ophthalmic lens is provided having a PET polarizing film integrally bonded thereto and, optionally, a hard coating integrally bonded to the PET polarizing film. In a preferred construction, the lens material may be surface treated, either physically and/or chemically, for integrally bonding the film to the lens material. Similarly, in another preferred construction, the film may be physically and/or chemically surface treated for integrally bonding a hard coating to the PET film.

13 Claims, 3 Drawing Sheets

OPHTHALMIC LENSES UTILIZING POLYETHYLENE TEREPHTHALATE POLARIZING FILMS

BACKGROUND OF THE INVENTION

The field of the present invention relates to ophthalmic lenses, and particularly to an ophthalmic lens utilizing a polarizing film.

A variety of ophthalmic lenses are known as described in, for example, U.S. Pat. Nos. 4,418,992 and 4,274,717, each of these disclosures hereby incorporated by reference as if fully set forth herein. Such lenses may comprise a number of different types of materials ranging from inorganic to thermoset plastics, such as allyl diglycol carbonate sold under the CR-39® trademark of PPG Industries, Inc. ("CR-39®"), to more recent formulations using thermoplastic materials, such as polycarbonate ("PC").

Commonly, polarizers used in hard resin thermoset lenses or polycarbonate thermoplastic lenses are based on polyvinylalcohol ("PVA") films imbued with a polarizing material. For thermoset lenses, the polarizing film is either adhesively bonded to a lens substrate, or it is placed within a mold assembly and the liquid resin mixture placed around it (sequentially or simultaneously) to form the lens. For thermoplastic lens production, the film is commonly part of a multi-layer construction (often referred to as a wafer) designed for better rigidity and thermal stability. Often this construction involves joining or encapsulating the polarizer with other polymers such as PC or cellulose acetate butyrate ("CAB") by co-extrusion, lamination, calendering, etc.

There are several limitations with these approaches. The common PVA base film is temperature-sensitive and therefore difficult to process with thermoplastics. In thermoplastic lens manufacturing, for example, monomer or polymeric pellets are heated past their softening point (for PC, above 230° C.), and injected into a mold form. Conventional polarizer films comprising PVA or similar polymers cannot withstand these temperatures. For instance, PVA has its glass transition temperature ("$T_g$") between 90–95° C., and softens with decomposition at approximately 200° C. Therefore, not only will the PVA film lose its shape, but it will also lose physical integrity (color, polarization efficiency, mechanical strength, etc.) at typical molding temperatures.

In addition to the temperature-sensitive film, the dyes or polarizing agents commonly used therein are also temperature-sensitive. The temperature-sensitivity of the common polarized film and the dyes or polarizing agents used therein can cause severe non-uniformity or non-reproducibility, adversely affecting either the optical and cosmetic quality of a given lens or lot-to-lot consistency.

The conventional approach to solve the temperature-sensitivity limitation of common polarizers has consistently been to clad the weak polarizing film with another more resistant plastic to survive the molding process. Such cladding is typically done by adhesively joining the film with at least one support layer or interposing the film between layers and adhesively combining the film to the support layers, as described for example in U.S. Pat. No. 5,051,309, which is incorporated by reference as if fully set forth herein.

Common adhesively joined products, however, are susceptible to delamination during either the lens molding process (heat and pressure excursions) or subsequent processing to form finished ophthalmic eyewear. Such delamination is a problem for thermoplastic molding, as well as thermoset resin lenses that sometimes depend upon adhesives to join the polarizer to the solid plastic lens substrate.

One reference, U.S. Pat. No. 5,059,356, which is incorporated by reference as if fully set forth herein, discloses a polarized film of polyethylene terephthalate (PET). This material has several advantages over PVA, including affordability, significantly better heat, moisture, and solvent resistance, and good mechanical stability. It is also more stable to ultra-violet radiation (UV), which is especially useful for lens production and coating processes with UV curing cycles.

The present inventors recognized that an ophthalmic lens utilizing PET film might offer advantages over an ophthalmic lens utilizing current PVA film if the PET film could be reliably incorporated into ophthalmic lens manufacture. Despite the potential advantages, the present inventors are unaware of any effective use of PET film in ophthalmic lenses. Its absence of effective incorporation into ophthalmic lens manufacture can be attributed to a number of different reasons.

The primary reason is due to PET's chemical inertness. A secondary reason includes PET's relatively low degree of optical quality, which is not able to match or accommodate ophthalmic lenses.

With respect to its chemical inertness, the present inventors have experimented with PET film and noted that PET cannot be reliably adhered within or to the lens and additional coatings cannot be reliably adhered to the PET film. In particular, the present inventors discovered that simple adhesive bonding (application of liquid adhesives or glues) is not acceptable for ophthalmic lenses that will undergo additional processing, such as grinding to prescription strength or edging to fit frames, or which will be subjected to additional coating processes for mechanical or optical enhancement.

In addition, it is not obvious that an unsupported PET film could be incorporated in an ophthalmic lens. With thermoset resins, many years of development were required to progress from clad PVA assemblies to free-standing film. While the inventors could build on this development, the challenge of PET's inertness still needed to be overcome to ensure reliable adhesion. With thermoplastics, even greater challenges are present, due to the high temperature processing. The standard approach has been to clad or encapsulate polarizing films. However, additional interfaces between solid surfaces always offer prime sites for delamination during further processing.

Accordingly, an ophthalmic lens and method or process of utilizing PET film to form the lens, wherein the film may be bonded to the lens material without additional plastic supports, without losing its required physical properties, and with high adhesion, is desired.

SUMMARY OF THE INVENTION

The preferred embodiments relate to an ophthalmic lens having a PET polarizing film integrally bonded thereto and, optionally, a hard coating integrally bonded to the PET polarizing film after it has been bonded to the lens. In a preferred construction, the PET film may be surface treated, either physically and/or chemically, for integrally bonding the film to the lens material. Similarly, in another preferred construction, the film may be physically and/or chemically surface treated for integrally bonding the hard coating to the PET film. Various other embodiments may utilize some but not all of the above elements, or may include additional refinements, while obtaining the benefit of an ophthalmic lens utilizing PET film.

BRIEF DESCRIPTION OF THE DRAWINGS

The various objects, features, and advantages of the present inventions may be better understood by examining the Detailed Description of the Preferred Embodiments found below, together with the appended figures, wherein.

DETAILED DESCRIPTION OF THE PREFERRED EMBODIMENTS

The preferred embodiments will now be described with respect to the drawings. To facilitate the description, any numeral identifying an element in one figure will represent the same element when used in any other figure.

Figure 1:
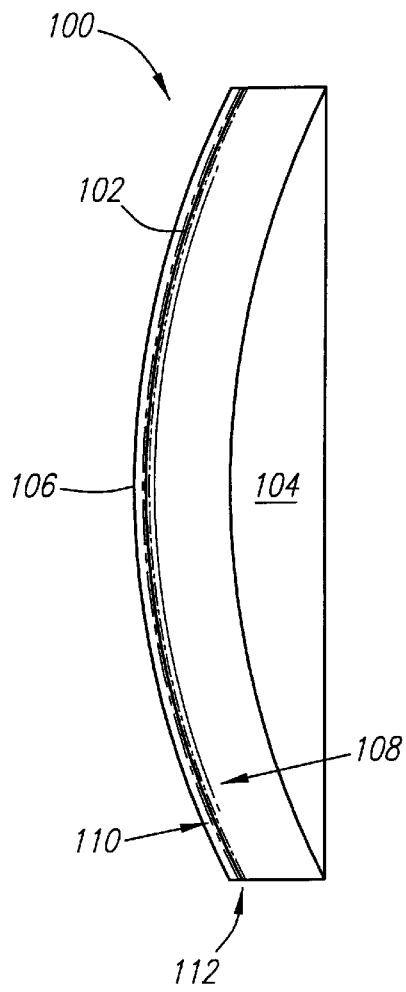
FIG. 1 shows an ophthalmic thermoplastic lens utilizing PET polarizing film, wherein the lens is constructed according to a preferred embodiment.
Figure 3:
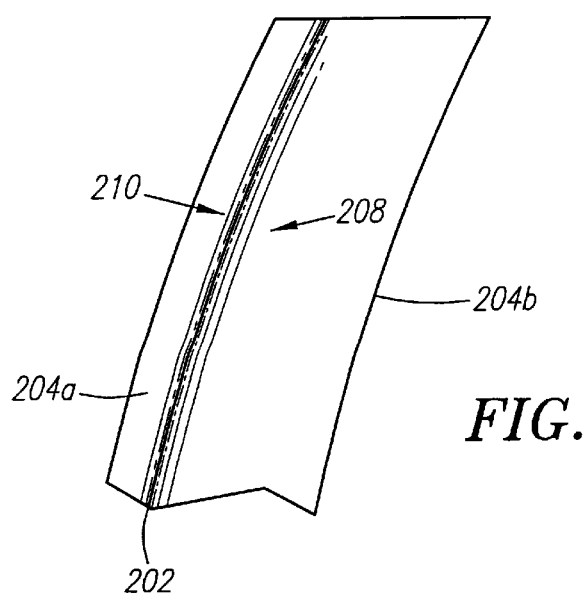
FIG. 3 shows a detailed view of the integral bonding that occurs between the PET polarizing film and the lens material, and particularly illustrates the integral bond between the PET film within the thermoset lens material shown in FIG. 2.

FIG. 1 shows an ophthalmic thermoplastic lens 100 utilizing PET polarizing film 102, wherein the lens 100 is constructed according to a preferred embodiment. The ophthalmic lens 100 includes a lens material 104 having a PET polarizing film 102 integrally bonded thereto and a hard coating 106 integrally bonded to the film 102 after it has been bonded to the lens material 104. As disclosed in detail below, the film may be surface treated, either physically and/or chemically, to effect an integral bond 108 (such a bond being shown in detail in FIG. 3 with respect to a thermoset lens) between the film 102 and the base lens material 104, i.e., the film 102 is unsupported and directly bonded to the lens material 104. Similarly, the film 102 may be physically and/or chemically surface treated to effect an integral bond 112 between the hard coating 106 and the film 102.

Figure 2:
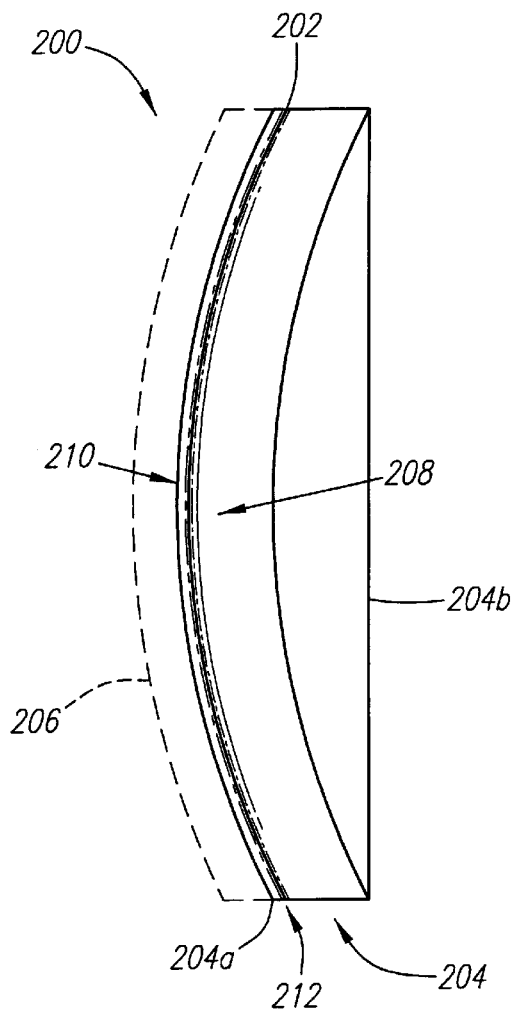
FIG. 2 shows an ophthalmic thermoset lens utilizing PET polarizing film, wherein the lens is constructed according to a preferred embodiment.

FIG. 2 shows an-ophthalmic thermoset lens 200 utilizing PET polarizing film 202, wherein the lens 200 is constructed according to a preferred embodiment. As with the thermoplastic lens illustrated in FIG. 1, the thermoset lens 200 includes a lens substrate or material 204 having a PET polarizing film 202 integrally bonded thereto. Unlike film 102 that is bonded at the front surface 112 of the thermoplastic lens 104 of FIG. 1, film 202 is bonded near the front surface 212 of the thermoset lens 204. In this manner, film 202 is interposed between first and second lens portions 204a, 204b of lens material 204. As the first portion 204a of the lens material 204 protects the film 202, there may be no need to hardcoat it. However, to protect the first portion 204a from abrasion and undue wear, lens portion 204a may optionally be hardcoated. Thus, as the hard coating 206 is optional, it is shown in dashed lines.

Similar to the integral bond between the thermoplastic lens material 104 and PET film 102 in FIG. 1, both sides of the PET film 202 may be surface treated, either physically and/or chemically, to effect an integral bond 208 between the film 202 and the second lens portion 204b and an integral bond 210 between the film 202 and the first lens portion 204a. Bonds 208, 210 are shown in detail in FIG. 3. Should a hard coat be desired, the first portion 204a of material 204 may be surface treated to improve adhesion of the hard coating 206 to the lens portion 204a.

Similar to the thermoplastic lens design, a thermoset lens could also be constructed with the PET polarizing film at the front surface of the final lens. In this embodiment, the PET film would be surface treated on one surface to integrally bond it to the lens material. If a hard coating is desired, the outer surface of the PET film may be physically and/or chemically treated for improved adhesion.

As noted above, the lens substrate or material may comprise a thermoset material or a thermoplastic material. With respect to thermoset materials, the preferred materials comprise polymers from diethylene glycol bis (allyl carbonate) or diallyl diglycol carbonate, such as CR-39® from PPG, or Akzo Nobel brands NS205, NS200 and NS207. The lens material may also comprise other thermoset materials such as polymers of 1,3 butylene glycol dimethacrylate, acrylonitrile, allyl methacrylate, ethoxymethyl methacrylate, ethylene glycol dimethacrylate, polyethylene glycol dimethacrylate; ally esters; co-polymers of allyl esters with styrene or vinyl type monomers, such as diallyl maleate, diallyl phthalate, methallyl methacrylate, etc.; and high index copolymers containing, e.g., vinyl functionality, isocyanates, urethanes, sulfur-containing aromatic vinyl compounds, and bromine-containing aromatic acrylic compounds.

With respect to thermoplastic materials, the preferred materials comprise PC resin such as that sold by Bayer, Inc. of Pittsburgh, Pa. under their trademarks Makrolon® DPI-1821 or 1815, or Lexan® OQ2720 manufactured by General Electric. The lens material may comprise other thermoplastic materials such as polysulfones, polyethersulfones, polyamides, polystyrenes; and mixtures of polycarbonate and polyurethanes, polyesters, polysulfones, polystyrenes, amorphous polyolefins, and acrylics.

The PET film should be of very high optical quality to match ophthalmic standards, such as Developmental Film 99-04 distributed by R&S Enterprises of Yokohama, Japan with a polarizing efficiency of at least 96.3% and a transmission average (400–700 nm) of 14–18%. The present inventors currently prefer the un-annealed form to the standard annealed form of Developmental Film 99-04 distributed by R&S Enterprises. The PET film may further comprise a crystalline or semi-crystalline naphthalene dicarboxylic acid polyester, such as polyethylene naphthalate polyester or a copolymer derived from ethylene glycol, naphthalene dicarboxylic acid, and some other acids such as terephthalate, as described in U.S. Pat. No. 5,882,774.

The hard coating may comprise a thermal or UV cured hard coat. UV hardcoats such as SDC-1175 (SDC Coatings, Inc.) for thermoplastic lenses or LTI-SHC-175Y, 33% solids, (Lens Technology I, L.L.C.) for thermoset lenses can be used.

Figure 4:
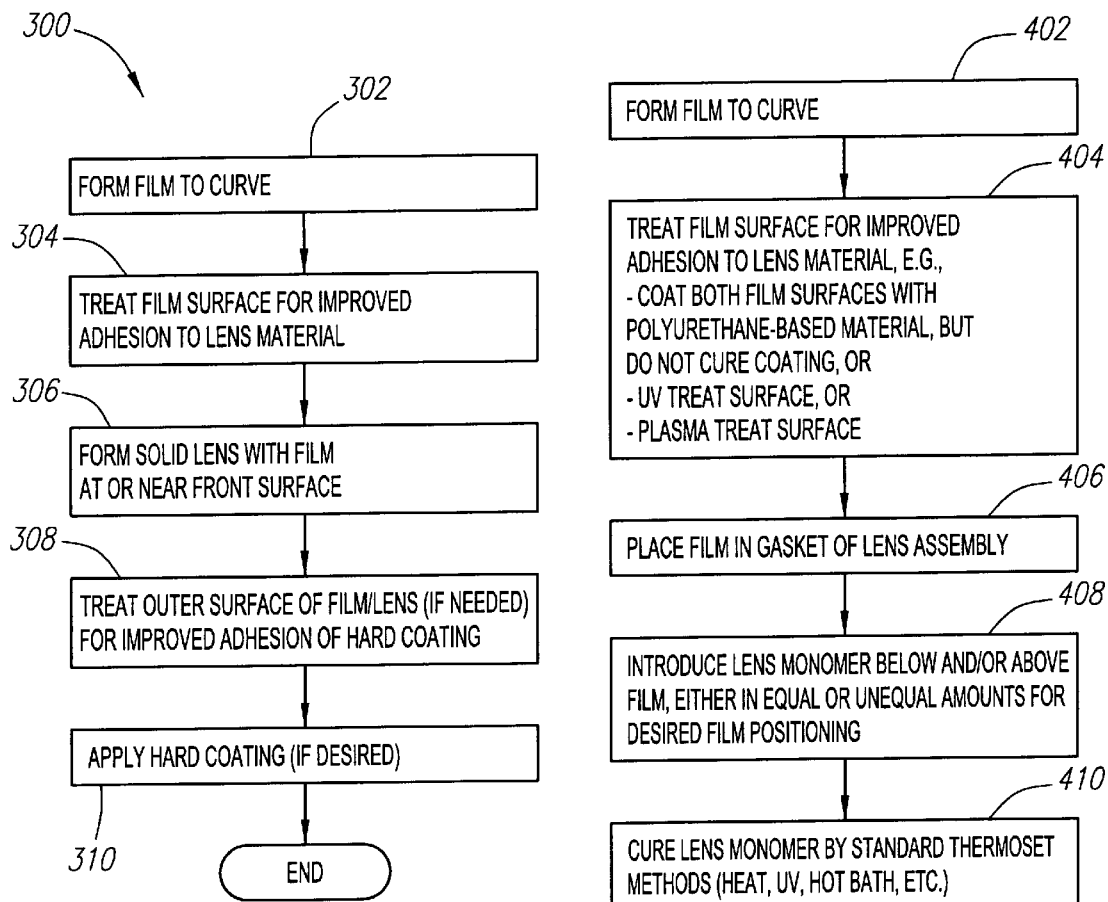
FIG. 4 is a flowchart illustrating the general process of using PET polarizing film in ophthalmic lenses.

Turning in detail to FIG. 4, a general process 300 of using PET polarizing film in ophthalmic lenses according to the preferred embodiments generally includes the first step of "Form film to curve" 302 for forming the film to curve or otherwise fit the desired shape of the lens substrate or material. The film may be curved or formed by techniques commonly known to those skilled in the art as described in, for example, U.S. Pat. No. 5,641,372 or 5,434,707, which disclosures are hereby incorporated by reference as if fully set forth herein.

After shaping or curving the film, due to the inert properties of the PET and its inability to reliably adhere to another material, the next step preferably includes "Treat film surface for improved adhesion to lens material" 304. For "integral bonding" (interpenetrated bonding or bonding at the molecular level) of the materials to occur, the film surface should be prepared or treated.

Different surface treatments or coatings, including primer layers, may be used to achieve the best adhesion with different materials (e.g., lens material vs. hard coating material). Thus, in order to increase the bonding of the inert PET film within the lens, physical and/or chemical treatments may be applied to the film. Such treatments may be sufficient alone to achieve good adhesion, or may be a pre-treatment prior to the application of an additional coating that further enhances integral bonding.

Although chemical bonds are generally stronger than physical bonds due to the reformed direct linkages between structures, rather than only depending on tangling of polymer chains, physical treatment can demonstrably increase adhesion. The physical treatment may include, for example, scrub roughening of the surface to achieve a "Velcro-like" effect. However, for even greater bond adhesion, physical treatment may be followed by chemical treatment.

Chemical treatment can include both modification of the surface reactivity of the PET film, or coating of the PET film with a reactive layer. The purpose in any such treatment is to enhance chemical bonding, i.e., compatible reactive sites.

Plasma and UV exposure are two methods for altering the surface reactivity. When PET is subjected to UV or plasma treatments, a common chemical change is the formation of either radicals or phenolic groups (aromatic rings with —OH groups) on the treated surface. Depending on the next layer for adhesion, these groups can be effective for strong bonding or can repel the new material. With respect to the general process 300 as illustrated in FIG. 4, these groups are beneficial species for improved bonding to subsequent thermal and UV curing hard coatings. Because of the molecular structure of CR39®-type hard resins and PC, UV and plasma treatment may also enhance adhesion to these lens materials as well.

Coatings that integrally bind to the film and subsequent materials are also preferred for adhesion promotion. A polyurethane coating may be applied by itself to the film to integrally bond with the lens material. Prior to the polyurethane coating, the film surface may be prepared or treated by using physical and/or chemical treatments. Alternatively, the film may be chemically prepared or treated for bond-breaking and bond formation between the surface and the subsequent layers by coating the film with other reactive layers, e.g., the film may be coated with a layer having reactive groups such as —OH groups.

As shown in FIG. 4, after step 304 is the step of "Form solid lens with film at or near front surface" 306. If thermoset lens forming is involved, those skilled in the art may use techniques commonly known to them as described in, for example, U.S. Pat. No. 4,090,830 and Applicant's ABO-approved presentation on sunwear, copyright 1999, each of these disclosures hereby incorporated by reference as if fully set forth herein. If thermoplastic lens forming is involved, those skilled in the art may use techniques commonly known to them as described in, for example, U.S. Pat. No. 5,718,849, which disclosure is hereby incorporated by reference as if fully set forth herein.

After step 306, the next step in the overview of the general ophthalmic manufacturing process 300 includes "Treat outer surface of film/lens (if needed) for improved adhesion of hard coating" 308. In this step, the film surface may be treated, physically and/or chemically, for integrally bonding the film to the hard coating. Once the film has been treated, a hard coating may be applied as illustrated in step "Apply hard coating (if desired)" 310.

Figure 5:
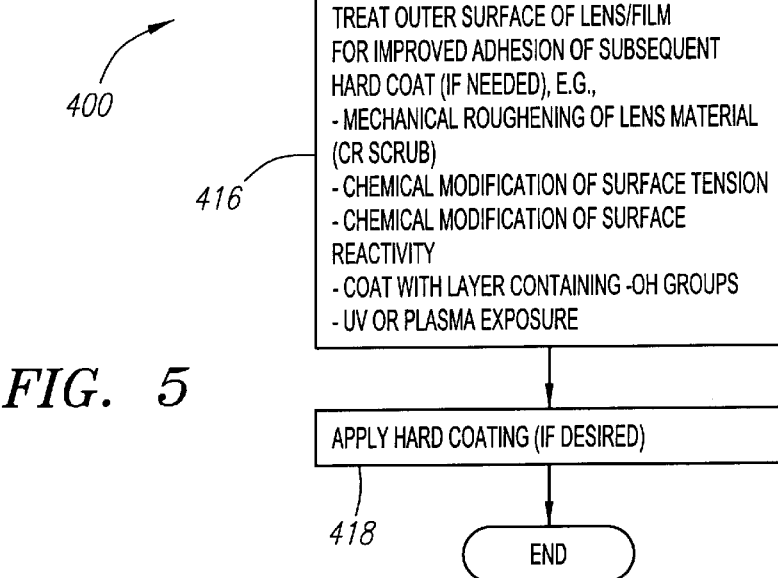
FIG. 5 is a flowchart illustrating thermoset lens forming that utilizes PET polarizing film according to a preferred embodiment.

Turning in detail to FIG. 5, a flowchart illustrates thermoset lens forming 400 that utilizes PET polarizing film according to a preferred embodiment. As shown therein, the first step includes "form film to curve" 402. Similar to the general process 300 flowchart illustrated in FIG. 4, the film may be formed or shaped using conventional techniques known to those skilled in the art. The next step preferably involves preparing the surface of the film to allow the film to integrally bond to the lens material. As shown in FIG. 5, the step is "Treat film surface for improved adhesion to lens material, e.g.,—coat both film surfaces with polyurethane-based material, but do not cure coating, or —UV treat surface, or—plasma treat surface" 404. As this step illustrates, both sides of the film or both film surfaces may be coated or dipped with an uncured polyurethane-based material or UV treated or plasma treated.

With respect to the UV treatment, conventional techniques known to those skilled in the art may be employed such as that described in, for example, "The Influence of Vacuum-Ultraviolet Radiation on Poly(ethylene terephthalate)," *Journal of Polymer Science: Part A: Polymer Chemistry,* Vol. 34, pp. 1511–1516 (1996), which disclosure is hereby incorporated by reference as if fully set forth herein.

With respect to the plasma treatment, conventional techniques known to those skilled in the art may be employed such as that described in, for example, "Plasma Treatment for Improved Bonding: A Review," *J. Adhesion,* Vol. 30, pp. 199–218 (1989) and "Plasma Sources for Polymer Surface Treatment," *Handbook of Thin Film Process Technology* (1996), which disclosures are hereby incorporated by reference as if fully set forth herein.

As shown in FIG. 5, after step 404, the next steps are "Place film in gasket of lens assembly" 406, "Introduce lens monomer above and below film, either in equal or unequal amounts for desired film positioning" 408, and "Cure lens monomer by standard thermoset methods (heat, UV, hot bath, etc.)" 410. If polyurethane has been used, the polyurethane bond is preferably strengthened for at least three hours as illustrated in the step of "Strengthen polyurethane bond (if used) by additional cure (e.g., 100° C., 3+ hours)" 412.

Assuming polyurethane was used and further strengthened in step 412, the next step, step 416, optionally includes treating the outer surface of the lens to improve adhesion of an optionally applied hard coating. The surface treatment of the lens may be physical or chemical treatments, or a combination thereof, which may include mechanical roughening of the lens material, chemical modification of the surface tension, chemical modification of the surface reactivity, or UV or plasma exposure.

Step 416 is illustrated in FIG. 5 as "Treat outer surface of lens/film for improved adhesion of subsequent hard coat (if needed), e.g., —Mechanical roughening of lens material (CR scrub)—Chemical modification of surface tension—Chemical modification of surface reactivity—Coat with layer containing —OH groups —UV or plasma exposure". The last step in the preferred thermoset lens forming process illustrated in FIG. 5 preferably includes the step of "Apply hard coating (if desired)" 418.

Figure 6:
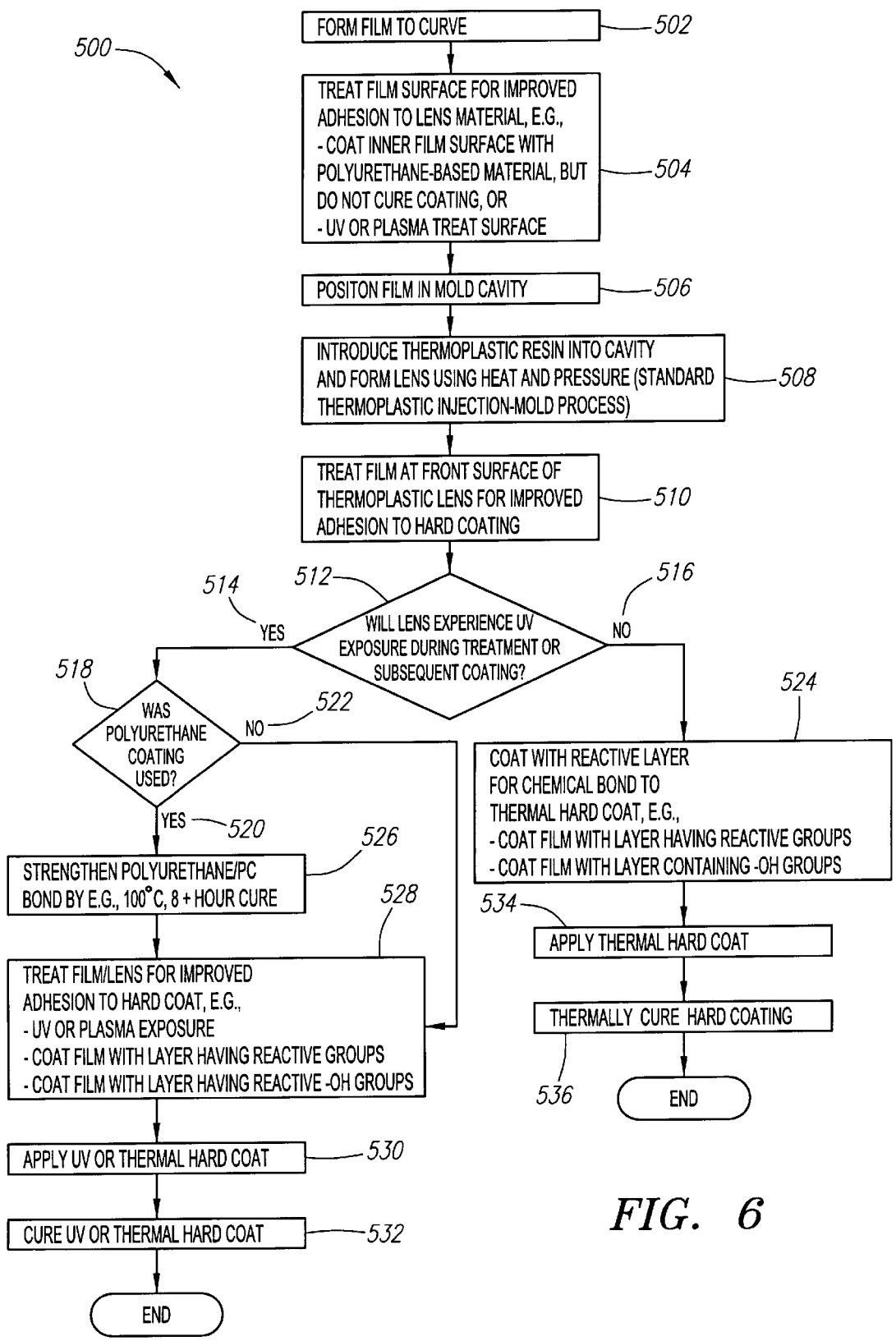
FIG. 6 is a flowchart illustrating thermoplastic lens forming that utilizes PET polarizing film according to a preferred embodiment.

FIG. 6 is a flowchart illustrating thermoplastic lens forming 500 that utilizes PET polarizing film according to a preferred embodiment. As shown therein, the first step of "Form film to curve" 502 is generally similar to steps 302, 402, respectively illustrated in FIGS. 4 and 5.

The next step of "Treat film surface for improved adhesion to lens material, e.g.,—coat inner film surface with polyurethane-based material, but do not cure coating, or—UV or plasma treat surface" 504 is directed to preparing the inner surface of the film facing the lens material, such as material 104, for integral bonding thereto.

The next steps of "Position film in mold cavity" 506 and "Introduce thermoplastic resin into cavity and form lens using heat and pressure (standard thermoplastic injection-mold process)" 508 involve conventional thermoplastic injection-molding techniques with the caveat that one should carefully manipulate the heat and pressure so as not to burn or deform the film.

In other words, the $T_g$ of PET is 69° C. and its melting point is 250–270° C. PC, a preferred thermoplastic lens material, has a $T_g$ of 145° C. and melts at 230° C. Therefore, when molding with PC, one is usually operating near 230° C. In normal PC molding operations, the mold surfaces are maintained at lower temperatures (e.g., 120–190° C.) to provide a fast heat sink for polymer solidification. However, both this temperature and the much hotter incoming PC could affect the optical or mechanical properties of a PET film (because of the low $T_g$). Carefully controlling the temperature of molding protects the PET from burning while still allowing the PC to flow smoothly within the mold. Typically, this control means dropping the molding temperatures approximately 30° F. for all stages of the molding process. Surprisingly, the inventors found the mold surfaces themselves could be maintained at the same temperatures used for normal molding of clear PC lenses, even when PET film was used.

Once the solid thermoplastic lens has been formed in step 508, the next step of "Treat film at front surface of thermoplastic Lens for improved adhesion to hard coating" 510 involves prepping the outer surface of the film for integrally bonding to the hard coating. This step may be effected in one of two ways, depending on whether the lens will experience UV exposure as illustrated in the step of "Will lens experience UV exposure during treatment or subsequent coating" 512.

If "YES," as shown in step 514, and if polyurethane was used, as shown in steps "Was polyurethane coating used?" 518 and "YES" 520, then the polyurethane/thermoplastic material bond should be strengthened as illustrated in the step of "Strengthen polyurethane/PC bond by e.g., 100° C., 8+ hour cure" 526.

Once the bond has been strengthened for more interpenetrated adhesion, the outside surface of the film may optionally be treated to integrally bond the optional hard coating to the film as shown in the step of "Treat film/lens for improved adhesion to hard coat, e.g.,—UV or plasma exposure—Coat film with layer having reactive groups—Coat film with layer having reactive —OH groups" 528. Once step 528 is accomplished, the hard coating should be applied and then cured as shown in the steps of "Apply UV or thermal hard coat" 530 and "Cure UV or thermal hard coat" 532.

Returning to step 512, if the lens will not experience UV exposure during treatment or subsequent coating as shown in step 516, the outer surface of the film is then preferably chemically treated for optionally bonding a hard coating thereto, as shown in step "Coat with reactive layer for chemical bond to thermal hard coat, e.g.,—Coat film with layer having reactive groups—Coat film with layer containing —OH groups" 524. Once treated, the hard coating should be applied and cured for integrally bonding the hard coating to the film as shown in the steps of "Apply thermal hard coat" 534 and "Thermally cure hard coating" 536.

The limitations inherent with attempting to bond inert PET film and the advantages allowed by the preferred embodiments are more particularly described in the following examples that are intended as illustrations only since modifications and variations within the scope of the general disclosure will be apparent to those skilled in the art. Thus, the following examples are not comprehensive but rather only illustrative examples.

Examples 1 and 2 demonstrate the limitations inherent with attempting to bond inert PET film, and respectively demonstrate the limitations pertaining to thermoplastic lens forming and thermoset lens forming.

EXAMPLE 1

A 4D (diopters of lens power, referenced to a refractive index of 1.53) curved PET film was positioned within a 4D single vision lens insert cavity of a polycarbonate-molding machine. Standard PC molding conditions were used to inject PC into the same cavity to form a polarized single vision lens.

Adhesion of the lens/film combination was not consistently acceptable, as measured by cutting a narrow cross-section of the lens, scoring into the lens from the back almost to the front surface, and then breaking the lens along the score line to determine where adhesion is lost. In a few instances, the intrinsic cohesiveness of the PET was exceeded before the lens delaminated. This means that a very strong bond was achieved. However, when additional lenses were made with the identical process and tested in the same manner, adhesion failure often occurred at the interface between the PET and the back surface of the lens.

Furthermore, the adhesion of subsequent hard coats was also inconsistent. A wet chemical hard coat (approximately 2–4 microns thick) was applied by standard spin coating techniques, then cured by infrared and UV light exposure for 25 seconds. This polarized lens was not compromised in color or polarizing efficiency by exposure to UV light during the hard coating process. However, the adhesion of the hard coat to the PET surface, as tested by the ASTM method of cross-hatch scoring of the hard coated surface, pressing 3M brand 810 tape firmly across the cut surface, and snap tape testing, showed highly variable results. Using the identical molding process, some lenses showed no coating removal, while others showed partial or entire removal of coating in the tested area.

EXAMPLE 2

A 4D curved PET film was positioned in a thermoset lens casting assembly (two glass lens surface molds, spaced apart from each other and held in that configuration by an outer plastic gasket). Standard lens casting procedures were used to form a hard resin lens around the PET film. Adhesion as measured by the cross-sectioning test described above showed marginal adhesion. Delamination between the PET film surface and the resin lens interfaces could be propagated by a sharp probe inserted at the edge of the lens.

EXAMPLE 3

Example 3 demonstrates the advantages allowed by treating the surface of the PET film prior to forming the solid lens with the film at or near the front surface of the lens material. Example 3 is directed to thermoplastic lens forming. However, as both sides of the PET film may be coated or dipped with polyurethane, the advantages of such treatment may equally apply to thermoset optical manufacturing (See Example 4). The inventors have successfully used this approach when casting polarized PVA/hard resin lenses.

As PC resin does not adhere to the PET film very well under normal injection parameters, experiments were designed and performed to treat the surface of the PET film to adhere to the PC lens material to an acceptable level. A number of different treatments were experimented with and adhesion was tested with each. Adhesion was roughly judged first by probing with a razor blade at the edge of the lens at the PET film/lens junction. If the blade could not be forced between the layers, testing was performed by the narrow cross-section bend test described above.

| | Treatment | Result |
|---|---|---|
| 1. | Chemical Treat: Acetone. | No increase in adhesion/fail |
| 2. | Chemical Treat: Heptane. | No increase in adhesion/fail |
| 3. | Chemical Treat: 10% Sodium Hydroxide. | No increase in adhesion/fail |
| 4. | Chemical Treat: Loctite 770 Adhesion Promoter. | No increase in adhesion/fail |
| 5. | Chemical Treat: Ethyl Benzene. | No increase in adhesion/fail |
| 6. | Chemical Treat: Toluene. | No increase in adhesion/fail |
| 7. | Physical Treat: CR-Scrub. (metal oxides in surfactant/detergent mix) | No increase in adhesion/fail |
| 8. | Low Level UV: Hand held plasma treater. | No increase in adhesion/fail |
| 9. | Chemical Treat: Polyurethane coating; cured 19 hrs@65° C. | No increase in adhesion/fail |
| 10. | Chemical Treat: Polyurethane coating; uncured | Large increase in adhesion/PASSES bend test |

EXAMPLE 4

Example 4 demonstrates the advantages of chemical treatment for a thermoset hard resin lens. Again, adhesion was roughly judged first by probing with a razor blade at the edge of the lens at the PET film/lens junction. If the blade could not be forced between the layers, testing was performed by the narrow cross-section bend test described above.

| | Treatment | Result |
|---|---|---|
| 1. | Chemical Treat: Dip coat with Polyurethane; cure coating. | Spotty adhesion/ fails bend test |
| 2. | Chemical Treat: Dip coat with Polyurethane; NO cure before lens casting. | Large increase in adhesion/ improved bend test |

EXAMPLE 5

Example 5 demonstrates the advantages allowed by surface treating the lens/film prior to the optional hardcoating step. Although optional, most ophthalmic lenses are hardcoated for improved abrasion resistance of at least the front surface of the lens. This step is particularly important for PC lenses because the softer material is easily scratched even in packaging and transport. Accordingly, Example 5 is primarily directed to thermoplastic lens forming, however, it also demonstrates the advantages of treating the lens surface of a thermoset lens should this lens be hardcoated.

The inventors discovered that current commercially available ultraviolet light-cured hardcoating solutions had little if any adhesion to the PET film. Coatings from various sources were tried without success, under a standard range of process conditions.

Experiments were then designed and performed to treat the surface of the PET film to adhere the hardcoat solution to an acceptable level. The following experiments were run using both an (SDC-1175) hardcoat, recommended for PC or acrylic lenses, and an (LTI-SHC-175Y, 33% solids) UV-cure hard coat commercially available and used for hard resin lenses. It was determined that the LTI hardcoat had a better affinity to PET than the SDC coating. However, the adhesion on untreated PET/PC lenses was still not acceptable as evaluated by the cross-hatch tape test.

The preferred method for best adhesion involved the following steps: the PET film was molded to the PC substrate or material, then treated with a D (BT9D, Fusion UV Systems, Inc.) lamp that exposed the sample to ultraviolet radiation. The lens was then hardcoated with the above LTI solution followed by UV curing of the coating with a D (BT9D) lamp.

Adhesion was tested by cross-hatch cutting the hardcoated surface, pressing 3M-brand 810 tape firmly across the cut region and quickly pulling the tape from the surface. An improvement in adhesion is indicated if less material is removed from the cross-hatched region, but a "fail" is still recorded if any coating is removed from the squares of the cross-hatch.

Other surface treatments were investigated, and their results are summarized below:

| | Treatment | Result |
|---|---|---|
| 1. | Chemical Treat: Acetone. | No increase in adhesion/fails tape test |
| 2. | Chemical Treat: Isopropanol. | No increase in adhesion/fails tape test |
| 3. | Chemical Treat: Heptane. | Slight increase in adhesion/fails tape test |
| 4. | Chemical Treat: 10% Sodium Hydroxide. | No increase in adhesion/fails tape test |
| 5. | Chemical Treat: Loctite 770 Adhesion. Promoter. | No increase in adhesion/fails tape test |
| 6. | Chemical Treat: Ethyl Benzene. | No increase in adhesion/fails tape test |
| 7. | Chemical Treat: Toluene. | No increase in adhesion/fails tape test |
| 8. | Physical Treat: CR-Scrub. (metal oxides in surfactant/detergent mix) | Moderate increase in adhesion/fails tape test |
| 9. | Low level UV exposure: Hand held plasma treater. | No increase in adhesion/fails tape test |
| 10. | Moderate UV exposure: HUHP (Fusion UV Systems, Inc.) mercury lamp. | Moderate increase in adhesion/ fails tape test |

-continued

| | Treatment | Result |
|---|---|---|
| 11. | Higher UV exposure: D lamp. | Large increase in adhesion/PASSES tape test |

Accordingly, a PET polarized ophthalmic lens and methods of ophthalmic lens manufacture are disclosed, wherein the manufacturing process integrally bonds the PET film to the lens material and optional hard coating without losing its required physical properties. While preferred embodiments are disclosed herein, many variations are possible which remain within the concept and scope of the invention. Such variations would become clear to one of ordinary skill in the art after inspection of the specification and drawings herein. The inventions therefore are not to be restricted except within the spirit and scope of the appended claims.

What is claimed is:

1. An ophthalmic lens comprising:
   a lens material; and
   a polarizing film comprising polyethylene terephthalate, wherein the film is integrally bonded to the lens material.

2. An ophthalmic lens according to claim 1 further comprising a hard coating, wherein the hard coating is integrally bonded to the film.

3. An ophthalmic lens according to claim 1, wherein the lens material is comprised of a hard resin thermoset material.

4. An ophthalmic lens according to claim 1, wherein the lens material is comprised of a thermoplastic lens material.

5. An ophthalmic lens according to claim 4, wherein the thermoplastic lens material comprises polycarbonate.

6. An ophthalmic lens according to claim 1, wherein the film further comprises a crystalline or semi-crystalline naphthalene dicarboxylic acid polyester.

7. A method of ophthalmic lens manufacture utilizing a polyethylene terephthalate polarizing film comprising the steps of:
   treating the surface of a polyethylene terephthalate polarizing film; and
   forming a solid lens with the film at or near a front surface of a lens, wherein the film is integrally bonded to the lens material.

8. A method of ophthalmic lens manufacture according to claim 7 further comprising the step of forming the film to a curved shape prior to the step of treating the surface.

9. A method of ophthalmic lens manufacture according to claim 7 further comprising the steps of treating the surface of the film for applying a hard coating thereon and applying the hard coating to the film, wherein the hard coating is integrally bonded to the film.

10. A method of ophthalmic lens manufacture according to claim 7, wherein the lens material is comprised of a hard resin thermoset material.

11. A method of ophthalmic lens manufacture according to claim 7, wherein the lens material is comprised of a thermoplastic lens material.

12. A method of ophthalmic lens manufacture according to claim 11, wherein the thermoplastic lens material comprises polycarbonate.

13. A method of ophthalmic lens manufacture according to claim 7, wherein the film further comprises a crystalline or semi-crystalline naphthalene dicarboxylic acid polyester.

* * * * *